United States Patent
Gaither et al.

(10) Patent No.: US 10,793,161 B2
(45) Date of Patent: Oct. 6, 2020

(54) SYSTEMS AND METHODS FOR SELECTIVE DRIVER COACHING BASED ON DRIVER EFFICIENCY

(71) Applicant: Toyota Motor Engineering & Manufacturing North America, Inc., Plano, TX (US)

(72) Inventors: Geoffrey D. Gaither, Brighton, MI (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 309 days.

(21) Appl. No.: 15/834,013

(22) Filed: Dec. 6, 2017

(65) Prior Publication Data
US 2019/0168767 A1 Jun. 6, 2019

(51) Int. Cl.
*B60W 40/09* (2012.01)
*B60W 30/18* (2012.01)
(Continued)

(52) U.S. Cl.
CPC ...... *B60W 40/09* (2013.01); *B60W 30/18072* (2013.01); *G09B 5/06* (2013.01);
(Continued)

(58) Field of Classification Search
CPC ....... B60W 40/09; B60W 30/18; G09B 19/16; G09B 5/06
See application file for complete search history.

(56) References Cited

U.S. PATENT DOCUMENTS 6,314,365 B1  11/2001 Smith
6,321,161 B1  11/2001 Herbst
(Continued)

FOREIGN PATENT DOCUMENTS

WO    2017017494    2/2017

OTHER PUBLICATIONS

BMW ConnectedDrive; https://www.youtube.com/watch?v=r1ORFGGfykw; dated Dec. 8, 2011.
(Continued)

*Primary Examiner* — Kira Nguyen
(74) *Attorney, Agent, or Firm* — Sheppard, Mullin, Richter & Hampton LLP; Hector A. Agdeppa; Daniel N. Yannuzzi

(57) ABSTRACT

Systems and methods of selective driver coaching are provided. Driver coaching systems learn the characteristics of a deceleration event. With the goal of increasing recouped energy while operating a hybrid electric vehicle (HEV), driver coaching systems predict when the HEV can begin coasting at the start of the deceleration event. In this way, the amount of time during which regenerative braking can be applied may be increased. Coaching cues are provided to the driver so that the HEV can be operated in way that achieves the goal of increasing recouped energy. However, engaging in excessive regenerative breaking can negate its advantages if the amount needed to reaccelerate the HEV to a cruising/steady speed is too great. Selective driver coaching provides coaching cues only if the operating efficiency of the HEV exceeds the operating efficiency of the HEV when controlled by the driver without coaching cues.

15 Claims, 9 Drawing Sheets

(51) Int. Cl.
*G09B 19/16* (2006.01)
*G09B 5/06* (2006.01)

(52) U.S. Cl.
CPC ..... *G09B 19/167* (2013.01); *B60W 2520/105* (2013.01); *B60W 2540/30* (2013.01); *B60Y 2200/92* (2013.01); *B60Y 2300/18125* (2013.01); *Y10S 903/903* (2013.01)

(56) References Cited

U.S. PATENT DOCUMENTS

| | | | |
|---|---|---|---|
| 9,229,905 B1 | 1/2016 | Penilla | |
| 9,463,806 B2 | 10/2016 | Rebhan | |
| 9,547,989 B2 | 1/2017 | Fairfield | |
| 9,613,466 B1 | 4/2017 | Bullock | |
| 2007/0038345 A1 | 2/2007 | Heider | |
| 2008/0297335 A1 | 12/2008 | Yeh | |
| 2010/0198508 A1* | 8/2010 | Tang | G01C 21/3469 701/414 |
| 2011/0313656 A1 | 12/2011 | Mignen | |
| 2012/0283893 A1 | 11/2012 | Lee | |
| 2013/0041621 A1* | 2/2013 | Smith | B60K 35/00 702/142 |
| 2013/0173111 A1* | 7/2013 | Syed | B60K 35/00 701/36 |
| 2013/0173128 A1* | 7/2013 | Syed | B60L 50/50 701/70 |
| 2015/0035666 A1* | 2/2015 | Scofield | B60W 40/09 340/439 |
| 2015/0367834 A1* | 12/2015 | Runde | B60W 10/06 701/22 |
| 2016/0026182 A1 | 1/2016 | Boroditsky | |
| 2016/0171521 A1 | 6/2016 | Ramirez | |
| 2017/0061825 A1 | 3/2017 | Payne | |
| 2017/0174221 A1 | 6/2017 | Vaughn | |
| 2017/0305434 A1 | 10/2017 | Ratnasingam | |
| 2017/0336801 A1 | 11/2017 | Shashua | |

OTHER PUBLICATIONS

John Beltz Snyder; New Tesla Features Make Car Sharin Easier; https://www.autoblog.com/2017/08/21/new-tesla-model-3-features-carsharing-smartphone-app-key-card/ , Aug. 21, 2017.

* cited by examiner

SYSTEMS AND METHODS FOR SELECTIVE DRIVER COACHING BASED ON DRIVER EFFICIENCY

TECHNICAL FIELD

The disclosed technology relates generally to automotive systems and technologies, and more particularly, some embodiments relate to selective implementation of driver coaching to increase efficiency during deceleration events.

DESCRIPTION OF THE RELATED ART

Many drivers are proficient at driving a vehicle. Drivers often operate vehicles, such as automobiles, on a daily basis, e.g., driving to and from work, driving to and from stores to run errands. Many drivers travel long distances in automobiles, such as when taking a road trip on a vacation.

Hybrid electric vehicles (HEVs) have become increasingly popular among drivers concerned with theft environmental impact and with increasing fuel economy. HEVs generally utilize an internal combustion engine (ICE) in conjunction with an electric motor, also referred to as a motor generator (MG). HEVs can achieve better fuel economy over a conventional (ICE-only) vehicle because the need for fossil fuel, e.g., gasoline, is reduced. HEVs also help reduce the carbon footprint of an individual by lessening the creation of toxic byproducts normally generated when operating a conventional fossil-fuel-powered vehicle. An HEV's electric motor can be powered by a battery, which requires recharging. In HEVs, a controller can monitor a battery state of charge (SOC) and/or battery residual charge to determine when to recharge the battery, as well as determine when to switch from utilizing its ICE to utilizing its electric motor and vice versa.

BRIEF SUMMARY OF EMBODIMENTS

In accordance with one embodiment, a computer-implemented method comprises detecting an initial instance of a deceleration event at a location. Upon repeated detection of additional instances of the deceleration event, data characterizing the deceleration event, subsequent reacceleration, and the location is stored. Simultaneously driver-controlled deceleration and reacceleration during and after the initial and additional deceleration events is measured. Coaching cues from estimated operating efficiency of a vehicle learned from the data characterizing the deceleration event, subsequent reacceleration, and the location may be generated. Additionally, driver-controlled operating efficiency of the vehicle based upon driver-controlled deceleration and reacceleration is determined. The driver-controlled operating efficiency is compared to the coached operating efficiency, and use of the coaching cues can be prohibited upon a determination that the driver-controlled operating efficiency exceeds the coached operating efficiency.

In some embodiments, the generation of coaching cues comprises determining a distance from the location prior to the deceleration event at which the vehicle should begin coasting by a driver of the vehicle releasing an accelerator pedal of the vehicle.

In some embodiments, the generation of the coaching cues comprises determining a time at which to enable expanded regenerative braking to aid in coached deceleration during the deceleration event following the release of the accelerator pedal. A period beginning from the time at which to enable regenerative braking until a time at which coached reacceleration begins can be maximized.

In some embodiments, the driver-controlled deceleration is achieved without engaging in regenerative braking. In some embodiments, a speed of travel of the vehicle during the driver-controlled deceleration and reacceleration is faster than a speed of travel of the vehicle during the coached deceleration and reacceleration.

In accordance with one embodiment, a system comprises one or more sensors configured to determine one or more operating characteristics of a vehicle indicative of the vehicle's operating efficiency. The system may further comprise a circuit communicatively connected to the one or more sensors via a data interface. The circuit can be configured to measure the vehicle's operating efficiency during deceleration and subsequent reacceleration as the vehicle navigates a road feature under control of a driver. The vehicle's operating efficiency during deceleration and subsequent reacceleration can be estimated as the vehicle navigates the road feature under assisted-driver control. The vehicle's measured operating efficiency under control of the driver can be compared to the vehicle's estimated operating efficiency under assisted-driver control. Coaching cues can be presented to the driver directing the driver to operate the vehicle in a manner commensurate with the assisted-driver control. This is done only upon a determination that the vehicle's estimated operating efficiency under assisted-driver control is more efficient than the vehicle's measured operating efficiency under control of the driver.

In some embodiments, the assisted-driver control is generated based on maximizing energy through regenerative braking applied during the deceleration. In some embodiments, the vehicle is a hybrid electric vehicle. In some embodiments, maximizing the energy through regenerative braking recharges a battery of the hybrid electric vehicle.

In some embodiments, the circuit is further configured to override presentation of the coaching cues. This can be done upon a determination that the vehicle's measured operating efficiency under control of the driver is more efficient than the vehicle's estimated operating efficiency under assisted-driver control.

In some embodiments, the vehicle's measured operating efficiency includes a reduced amount of fuel needed by an internal combustion engine of the vehicle to assist in achieving the subsequent reacceleration.

In accordance with one embodiment, a computer-implemented method comprises detecting a deceleration event while a hybrid electric vehicle (HEV) is operating. Deceleration and reacceleration energies associated with driver only-controlled operation of the HEV are measured. Energy savings based on driver-assisted operation of the HEV are estimated. Information reflecting the estimated energy savings based on the driver-assisted operation of the HEV is stored. Energy savings based on the driver only-controlled operation of the HEV are calculated. The calculated energy savings based on the driver only-controlled operation of the HEV can be compared to the estimated energy savings based on the driver-assisted operation of the HEV. This can be done to determine whether or not to generate coaching advice for achieving the driver-assisted operation of the HEV.

In some embodiments, measuring the deceleration and reacceleration energies comprises calculating at least one of battery power consumption and fuel consumption during deceleration and reacceleration of the HEV. In some embodiments, estimating the energy savings based on the driver-assisted operation of the HEV comprises estimating the energy needed during deceleration and reacceleration of the HEV. This energy can be estimated as a function of energy recouped through regenerative braking applied during the deceleration of the HEV.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1A:
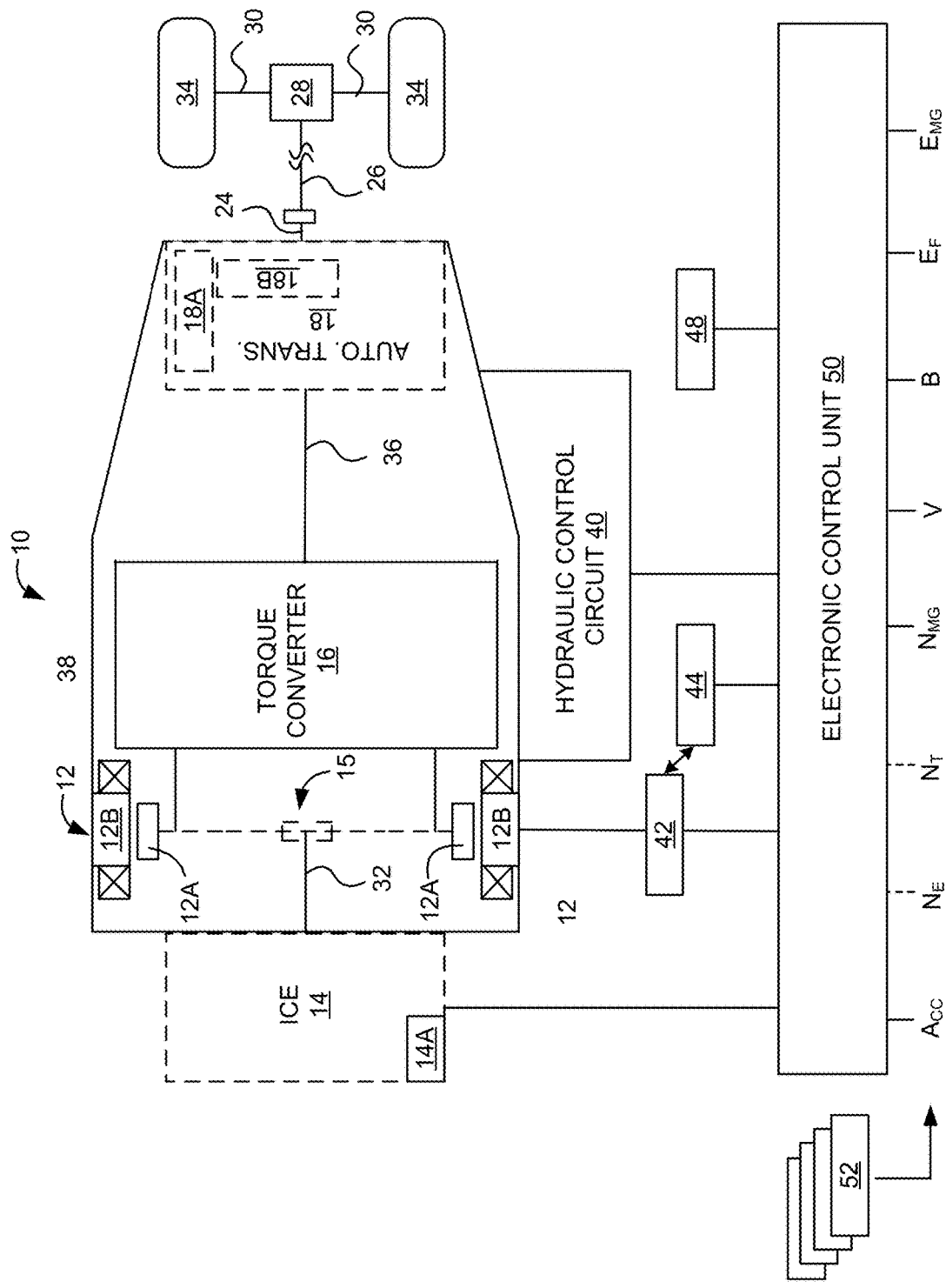
FIG. 1A illustrates an example of a vehicle with which systems and methods for selective driver coaching can be implemented in accordance with one embodiment of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed towards systems and methods for selective driver coaching based on driver efficiency. A driver coaching system can monitor a driver's behavior relative to a location, such as when the driver is approaching a stop, turn, etc. Over time, the driver coaching system learns where/when a driver is likely to decelerate, suggest to the driver when to release the accelerator pedal, and implement regenerative braking to aid in deceleration and recharge the vehicle's battery. In this way, a stop/deceleration event can be used as an opportunity to regain energy, not to mention energy is not wasted through friction braking. However, driver coaching systems often only consider operating efficiency up to and/or during deceleration. The potential decrease in operating efficiency due to the need to reaccelerate after deceleration is not considered. Thus, "overall" operating efficiency associated with a driving event/location may actually suffer when operating a vehicle in accordance with a driver coaching system.

Accordingly, a driver coaching system can be configured to be selective. That is, if a driver coaching system during its learning process, determines that the driver's own manner of operating the vehicle is more efficient, the coaching system can be disabled or otherwise not used for that driving event/location. For example, a driver may approach a particular turn repeatedly during his/her drive to work. In order to negotiate the turn, the driver may decelerate using friction braking while maintaining enough speed so that the amount of reacceleration needed to continue driving after the turn is relatively low.

Over time, the driver coaching system may learn and determine when the driver should release the accelerator pedal in order to coast into the turn, maximizing the time period during which regenerative braking can applied. However, maximizing the time period of regenerative braking can result in dropping the speed of the vehicle so much that a relatively significant amount of reacceleration is needed to bring the vehicle up to speed after the turn. In some cases, the driver's manner of operating the vehicle is more efficient than that suggested by the driver coaching system. This is because the energy needed for reacceleration is so great the energy savings based on increased regenerative braking are negated. In this type of scenario, the driver coaching system may be overridden in favor of letting the driver continue to navigate the turn without any coaching. Overriding the driver coaching system can take various forms. In some embodiments, it may result in suspending the learning process for a particular event/location. In other embodiments, the driver coaching system may be disabled, preventing a coaching notification from being presented to the driver for a particular event/location.

It should be understood that the systems and methods disclosed herein can be applied to existing driver coaching systems and methods. In other embodiments, a driver coaching system and method can be configured or designed (from the ground up) to operate in the disclosed manner. Driver coaching in accordance with various embodiments may be controlled by a driver coaching circuit implemented in or as part of a vehicle's electronic control unit. The driver coaching circuit can receive data from one or more sensors or derive data based on sensor data regarding operating efficiency of the vehicle being driven in order to decide whether or not to coach the driver.

An example HEV in which selective driver coaching may be implemented is illustrated in FIG. 1A. FIG. 1A illustrates a drive system of a hybrid electric vehicle 10 that may include an internal combustion engine 14 and one or more electric motors 12 as sources of motive power. Driving force generated by the internal combustion engine 14 and motor 12 can be transmitted to one or more wheels 34 via a torque converter 16, a transmission 18, a differential gear device 28, and a pair of axles 30.

As an HEV, vehicle 10 may be driven/powered with either or both of engine 14 and the motor(s) 12 as the drive source for travel. For example, a first travel mode may be an engine-only travel mode that only uses ICE 14 as the drive source for travel. A second travel mode may be an EV travel mode that only uses the motor(s) 12 as the drive source for travel. A third travel mode may be an HEV travel mode that uses engine 14 and the motor(s) 12 as drive sources for travel. In the engine-only and HEV travel modes, vehicle 10 relies on the motive force generated at least by ICE 14, and a clutch 15 may be included to engage engine 14. In the EV travel mode, vehicle 10 is powered by the motive force generated by motor 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 12 can also be used to provide motive power in vehicle 10, and is powered electrically via a power storage device 44. Motor 12 can be powered by power storage device 44 to generate a motive force to move the vehicle and adjust vehicle speed. Motor 12 can also function as a generator to generate electrical power such as, for example, when coasting or braking. Power storage device 44 may also be used to power other electrical or electronic systems in the vehicle. Motor 12 may be connected to power storage device 44 via an inverter 42. Power storage device 44 can include, for example, one or more batteries, capacitive storage units, or other storage reservoirs suitable for storing electrical energy that can be used to power one or more motors 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motors and adjust the current received from motors 12 during regenerative coasting and breaking. As a more particular example, output torque of the motor 12 can be increased or decreased by electronic control unit 50 through the inverter 42.

A torque converter 16 can be included to control the application of power from engine 14 and motors 12 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motors 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of ICE 14 (engine RPM), a rotational speed, $N_{MG}$, of the motor 12 (motor rotational speed), and vehicle speed, $N_V$. These may also include torque converter 16 output, $N_T$ (e.g., output amps indicative of motor output), brake operation amount, B, battery SOC (i.e., the charged amount for battery 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (ICE 14+motor 12) efficiency, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensor 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 1B:
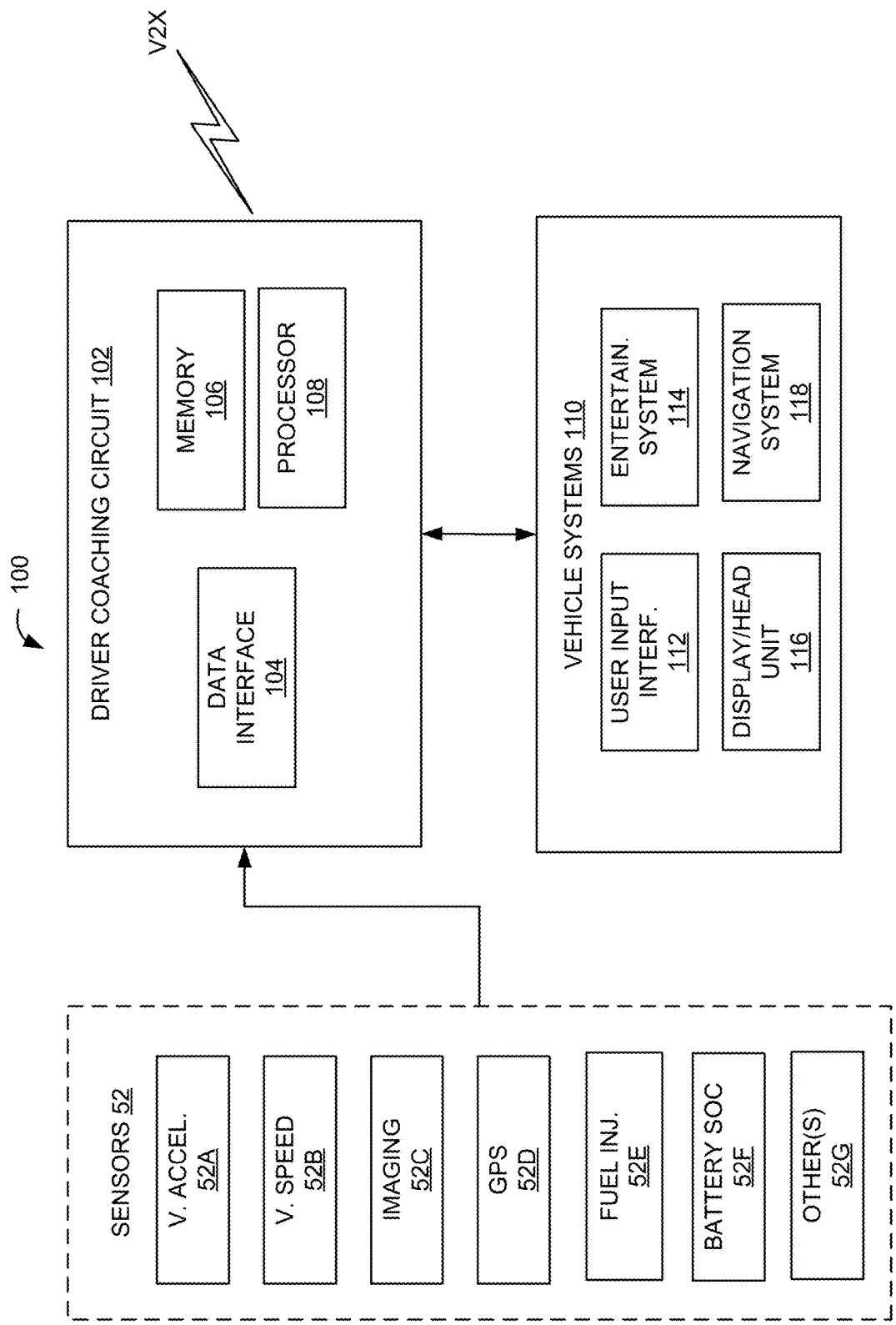
FIG. 1B illustrates an example architecture for implementing selective driver coaching in the vehicle of FIG. 1A.

FIG. 1B is a diagram illustrating an example of a selective driver coaching system in accordance with one embodiment of the present disclosure. In this example, system 100 includes a driver coaching circuit 100, a plurality of sensors 52A-G, and a plurality of vehicle systems 110. Sensors 52A-G and vehicle systems 110 can communicate with driver coaching circuit 102 via a wired or wireless communication interface. Although sensors 52A-G and vehicle systems 110 are depicted as communicating with driver coaching circuit 102, they can also communicate with each other as well as with other vehicle systems. Driver coaching circuit 102 can be implemented as a standalone electronic control unit or as part of an electronic control unit such as, for example electronic control unit 50.

Driver coaching circuit 102 in this example includes a data interface 104, a memory 106, and a processor 108. Components of driver coaching circuit 102 may communicate with each other via a data bus, although other communication in interfaces can be included.

Processor 108 may be a GPU, CPU, microprocessor, or any other suitable processing system. The memory 106 may include one or more various forms of memory or data storage (e.g., flash, RAM, etc.) that may be used to store the calibration parameters, images (analysis or historic), point parameters, instructions and variables for processor 108 as well as any other suitable information. Memory 106 can be made up of one or more modules of one or more different types of memory, and may be configured to store data and other information as well as operational instructions that may be used by the processor 108 to control driver coaching circuit 102.

Although the example of FIG. 1B is illustrated using processor and memory circuitry, as described below with reference to circuits disclosed herein, driver coaching circuit 102 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driver coaching circuit.

Data interface 104 can be either a wireless communications/processing interface or a wired communications/processing interface with an associated hardwired data port (not illustrated). As this example illustrates, communications with driver coaching circuit 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 52A-G and vehicle systems 110. A wired data interface can communicate with other devices using Ethernet or any of a number of other wired communication protocols whether standardized, proprietary, open, point-to-point, networked or otherwise.

Data interface 104 can be used to transmit and receive data between driver coaching circuit 102 and sensors 52A-G, as well as between driver coaching circuit 102 and vehicle systems 110. For example, data interface 104 can be configured to receive data and other information from, e.g., vehicle acceleration sensor 52A. This sensor data can be used to determine the rate of acceleration (or deceleration) vehicle 10 may be experiencing. Data interface 104 may also receive information associated with a particular location vehicle 10 is traversing from GPS receiver 52D. Data interface 104 may further receive information that directly or indirectly reflects vehicle 10's operating efficiency, e.g., battery SOC, fuel consumption, etc.

Sensors 52A-G may be example embodiments of sensors 52 illustrated in FIG. 1A. Sensors 52A-G can include one or more of the above-mentioned sensors and/or other sensors capable of sensing vehicle operating conditions that may be used to decide whether or not to implement driver coaching or defer to driver-controlled vehicle operation. It should be understood that not all the illustrated sensors are necessarily needed, and that additional sensors (other sensor(s) 52G) may be used.

For example, battery SOC information from SOC sensor 52F can be correlated with one or more of a deceleration and acceleration event (determined from vehicle acceleration sensor 52A) and the location at which the event occurred. The location can be determined by, e.g., GPS sensor 52D. In this way, the amount of energy gained/lost (based on battery SOC) during a particular driving event can be determined. As another example, the amount of fuel injected into ICE 14 can be received by data interface 104 from fuel injection sensor 52E. The amount of fuel used during an acceleration/deceleration event sensed by vehicle acceleration sensor 52A (and the location at which it occurred determined by GPS sensor 52D) can be used to determine fuel efficiency.

In some embodiments, an imaging sensor 52C, such as a camera may be used to visually determine vehicle 10 is approaching or traversing a turn. Navigating a turn is one example of a driving events during which driver-controlled operation of a vehicle can result in greater overall efficiency compared to that achieved with driver-coached operation of a vehicle. This is because the vehicle reaccelerates after exiting the turn. A driver coaching system that does not consider the need to reaccelerate only focuses on deceleration through regenerative braking. That is, a driver may be coached to release the vehicle's accelerator pedal as soon as possible prior to the turn, allowing regenerative braking to occur for as long as possible. However, this may result in a speed reduction so great that the energy needed for reacceleration negates or even exceeds the energy recouped or regained through regenerative braking. In this scenario, it would more beneficial for overall operating efficiency (deceleration and reacceleration) to allow the driver to operate the vehicle in his/her normal manner of operation. If, however, the driver does not operate the vehicle in a manner that results in, e.g., greater overall operating efficiency, the driver coaching system may still be allowed to coach the driver.

It should be noted a stop event, e.g., coming to and stopping completely at a stop sign requires reacceleration from a zero-speed condition. Thus, It is unlikely (although still possible) that driver-controlled operation of a vehicle results in better overall operating efficiency than driver-coached operation of the vehicle in such a scenario.

In some embodiments, other sensors may be used to provide data that can be used in a calculation or comparison operation to determine whether or not driver coaching should be enabled, provide coaching advice, etc. For example, a vehicle speed sensor 52B may be configured to determine the speed at which vehicle 10 is traveling. In some embodiments, vehicle speed sensor 52B may be a sensor configured to determine the number of revolutions one or more wheels (e.g., wheels 34) are turning over some period of time. This number of revolutions may be translated into vehicle speed through one or more known calculations that may be performed on vehicle speed sensor 52B or that may be performed by processor 108. In some embodiments, vehicle speed sensor 52B may be a radar, sonar, or other device that uses, e.g., the Doppler effect, to determine the speed at which vehicle 10 is traveling. For example, a radar may be used to transmit a beam to a roadside object, such as a traffic sign, and the speed of vehicle 10 can be determined based upon the change in frequency of the beam upon bouncing back from the roadside object.

Vehicle speed may be used as a parameter in judging operating efficiency of a vehicle. For example, as alluded to above, the decision to coach a driver can depend on the need to reaccelerate after or upon exiting a turn. The operating efficiency of a vehicle can be determined based upon a particular vehicle speed, e.g., cruising speed, at which time, the need to reaccelerate ends. In other words, a certain vehicle speed can be a boundary of a measurement of the overall operating efficiency of a vehicle.

In some embodiments, a GPS sensor (which may be a GPS receiver) 52D can be used to determine the location of vehicle 10 at some point in time. Based on a subsequent location to which vehicle 10 has traveled and the time it took for vehicle 10 to traverse the distance to the subsequent location can be used to determine its speed. Again, GPS sensor 52D may have the capability to perform this speed calculation, or the locations data alone may be transmitted to processor 108 to be translated into vehicle speed data. In some embodiments GPS sensor 52D may communicate with one or more location-based systems, navigation information providers, and the like to receive location information that can ultimately be used to calculate the speed at which vehicle 10 is traveling. It should be understood that although other types of sensors/receivers operable in other types or forms of positioning/location systems, e.g., GLONASS, GALILEO, BEIDOU, etc.

In still other embodiments, vehicle 10 may communicate with roadside units of a vehicle-to-infrastructure (V2I) communications system or one or more other vehicles (V2V communications) (both referred to as V2X communications) to determine and/or receive information indicative of the speed at which it is traveling. These V2X communications may occur between one or more roadside units and/or one or more other vehicles. They can be received directly by hazard light control component 102 or another electronic control unit or other communications component of vehicle 10 (and forwarded to hazard light control component 102 vis data interface 104).

As noted previously, operating efficiency can be determined based on the amount of power consumed from battery 44 and/or the amount of fuel used over a particular driving event, such as a stop or turn. GPS sensor 52D can be used to determine where that stop or turn occurs so that over time, driver coaching circuit 102 can learn how much battery power and/or fuel is used during deceleration and reacceleration for that driving event. The location of vehicle 10 can be used to determine where the driver coaching system should provide deceleration advice (e.g., when/where the driver should release the accelerator pedal to begin coasting at which time, regenerative braking can be applied).

Driver coaching circuit 102 may receive the aforementioned sensor or sensor-derived information regarding vehicle 10's location, and any acceleration/deceleration events that occur at vehicle 10's location, as well as vehicle 10's operating efficiency. From this information, driver coaching circuit 102 can learn when, where, and/or whether a driver of vehicle 10 can be coached to operate vehicle 10 more efficiently. Driver coaching circuit 102 can also compare the driver-coached operating efficiency of vehicle 10 (through deceleration) to the driver-controlled operating efficiency of vehicle 10 (through deceleration and reacceleration). Based on this comparison, driver coaching circuit 102 may or may not provide coaching advice to the driver of vehicle 10. It should be noted that in some embodiments, driver coaching circuit 102 may process the sensor or sensor-derived information and calculate the operating efficiency of vehicle 10 under various circumstances.

For example, location information regarding vehicle 10 may be received by driver coaching circuit 102 via data interface 104 from GPS sensor 52D. This location information may be stored in memory 106. At the same time, driver coaching circuit 102 may receive deceleration/reacceleration information indicating the amount of deceleration/reacceleration vehicle 10 is experiencing at that location. This deceleration/reacceleration information may also be stored in memory 106 and correlated with the location information. This collection of information can occur over some determined time period, for some number of repetitions, etc. For example, driver coaching circuit 102 may store information characterizing the deceleration event at the same location for five occurrences. Based on this stored information, processor 108 may determine that vehicle 10 is approaching a turn during which the driver operates vehicle 10 in such a way that it decelerates by some average amount before reaccelerating.

It should be noted that location information can also be determined based on querying a navigation system 118. Navigation system 118 may operate in conjunction with GPS sensor 52D and/or receive location or navigation information from a third party provider via V2X communications, radio communications, etc. For example, based on route information input into navigation system 118, driver coaching circuit 102 may determine that vehicle 10 is traveling a route that involves navigating a turn. When GPS sensor 52D indicates that vehicle 10 is nearing the turn, driver coaching circuit 102 may begin querying the relevant sensors 52 to determine vehicle acceleration, vehicle speed, fuel consumption, etc. This collection of sensor data can occur until GPS sensor 52D indicates that vehicle 10 has navigated the turn.

The collected sensor data can be analyzed by processor 108 to determine the manner in which the driver of vehicle 10 is negotiating the turn, and in particular, how efficient he/she is operating vehicle 10. That is, processor 108 can determine how much vehicle 10 decelerates leading up to and throughout the turn. Based on this information, processor 108 may perform one or more calculations to determine whether energy can be recaptured during deceleration, i.e., when the accelerator pedal is not being actuated by the driver. If so, processor 108 may determine when the driver should release the accelerator pedal so that vehicle 10 can coast, and regenerative braking can be applied to decelerate vehicle 10 without using friction braking (that consumes energy), and recapture energy. Examples of driver coaching systems that provide coaching advice include those disclosed in commonly-assigned U.S. Pat. Nos. 8,862,342 and 9,202,378, as well as U.S. Patent Publication Nos. 2017/0088049 and 2017/0061825, each of which are incorporated herein by reference in their entirety. Any one or more of these systems and methods of providing driver coaching may be used to effectuate the driver coaching functionality disclosed herein, which may then be augmented by allowing the driver coaching to be selectively applied.

In addition, and although the driver coaching circuit 102 provides coaching advice based on operating efficiency information throughout deceleration, reacceleration information is also recorded. This reacceleration information comprises the amount of reacceleration that occurs, as well the energy (fuel or battery power) needed to power vehicle 10 to achieve the desired reacceleration. In this way, processor 108 may compare the operating efficiency, e.g., fuel or battery power consumed, during deceleration at a certain location of vehicle 10 when driving in accordance with driver coaching advice. That is, processor 108 may estimate, through one or more calculations, the amount of energy that can be recouped through regenerative braking. This can be subtracted from the amount of energy consumed through driver-controlled operation of vehicle 10 (i.e., the energy consumption information obtained through driver coaching circuit 102's learning process described above). The result is an estimate of how efficiently vehicle 10 can be operated in a driver-coached manner. For example, fuel economy may benefit from an overall reduction in the energy used to maintain vehicle speed because less deceleration results in less reacceleration needed, which in turn results in less overall fuel being consumed. In HEVs, the ICE, e.g., ICE 14 of vehicle 10 are used during acceleration as ICE 14 can provide more power and/or add to the power of motor 12.

As noted above, the overall operating efficiency associated with driver-controlled operation of vehicle 10 is determined by learning how much energy is consumed during deceleration as well as reacceleration up to some determined vehicle speed, e.g., cruising speed. Alternatively, the amount of energy consumed can determined up to a point where vehicle 10 is no longer accelerating.

Processor 108 can also estimate the amount of energy that would be consumed by reaccelerating to the determined vehicle speed/when acceleration is no longer needed after the driver coached deceleration. In this way, the overall energy consumption/operating efficiency in driver-controlled and driver-coached conditions can be determined. Processor 108 may then compare the respective overall operating efficiencies of driver-controller operation and driver-coached operation. This can be done prior to providing driver coaching advice so that processor 108 can determine whether or not to continue with providing the coaching advice or without the coaching advice. In some embodiments, this determination is incorporated as part of the driver coaching learning process (rather than used to augment driver coaching systems that are based solely on deceleration operating efficiency). Accordingly, this comparison may be performed prior to generating any driver coaching advice.

Only after it is determined that driver-coached operation is more efficient that driver-controlled operation is driver coaching advice generated and provided.

Memory 106 may be used for "long-term" storage or, e.g., as a buffer or real-time cache used to store relevant sensor or sensor-derived information that processor 108 uses in the manner described herein. For example, memory 106 may be used a long-term storage for the storage of location, operating efficiency, and other information while driver coaching circuit 102 is learning. In other instances, memory 106 may be used as a cache for vehicle 10's real-time deceleration/reacceleration information. For example, during portions of a driving event, sensor or sensor-derived information can be received periodically and summed to arrive at an aggregate operating efficiency that applies to the entire driving event.

In the example illustrated in FIG. 1B, vehicle systems 110 include user input interface 112, entertainment system 114, display/head unit 116, and navigation system 118.

User input interface 112 may include one or more user input interfaces such as buttons, knobs, hard keys, soft keys, voice-controlled input, a touch screen element or aspect of display head unit 116, and the like. User input interface 112 allows a user, such as a driver or passenger of vehicle 10 to interact with one or more of vehicle systems 110. For example, as noted above, a driver may input a route into navigation system 115 using user input interface 112, wherein the route information is used by driver coaching circuitry 102 in providing driver coaching advice to the driver. In some embodiments, as noted above, driver coaching circuit 102 may be disabled in favor of driver-controlled operation of vehicle 10. Accordingly, display/head unit 116 may present a notification to the driver requesting that the driver confirm he/she wishes to allow driver-coached advice to be disabled or overridden.

Entertainment system 114 may include one or more audio-based systems, such as speakers or other devices used to present audio to a driver or passenger(s) of vehicle 10. In some embodiments, entertainment system 114 may be used to provide audible driver-coaching advice to the driver. Entertainment system 114 may include a stereo, radio, media player, and/or other entertainment-related systems or devices. Entertainment system 114 may work in conjunction with display/head unit 116 to present audio-visual notifications to the driver. For example, both visual driver coaching advice can be presented a driver (FIG. 2B) as well as corresponding audible driver coaching advice. It should be understood that there may be multiple displays in vehicle 10 and the presentation of driver coaching advice may occur on different ones of these displays, e.g., a dashboard, a dashboard display, a heads up display, etc.

Figure 2A:
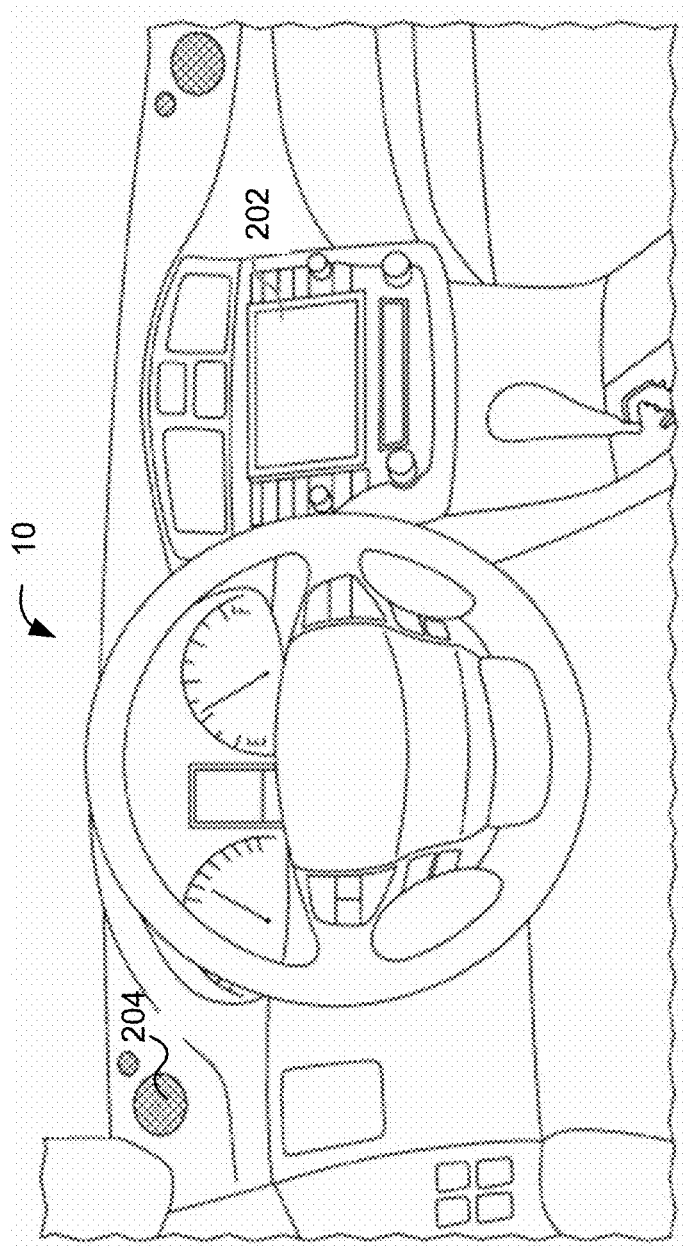
FIG. 2A illustrates an example vehicle interior in which selective driver coaching can be implemented in accordance with one embodiment of the present disclosure.

FIG. 2A illustrates an interior of a vehicle, e.g., vehicle 10, in which selective driver coaching in accordance with various embodiments may be implemented. The interior of vehicle 10 may comprise an area in which display/head unit 202 (an embodiment of display/head unit 116) is located. Display/head unit 202 may provide a visual interface to entertainment system 114 and navigation system 118. Moreover, display/head unit 202 may include touchscreen functionality, which may be an embodiment of user input interface 112. Additionally, the interior of vehicle 10 may include and one or more areas in which one or more speakers 204 (which may be a part of entertainment system 114) are located for presenting audio entertainment or information to a driver or passenger(s).

Figure 2B:
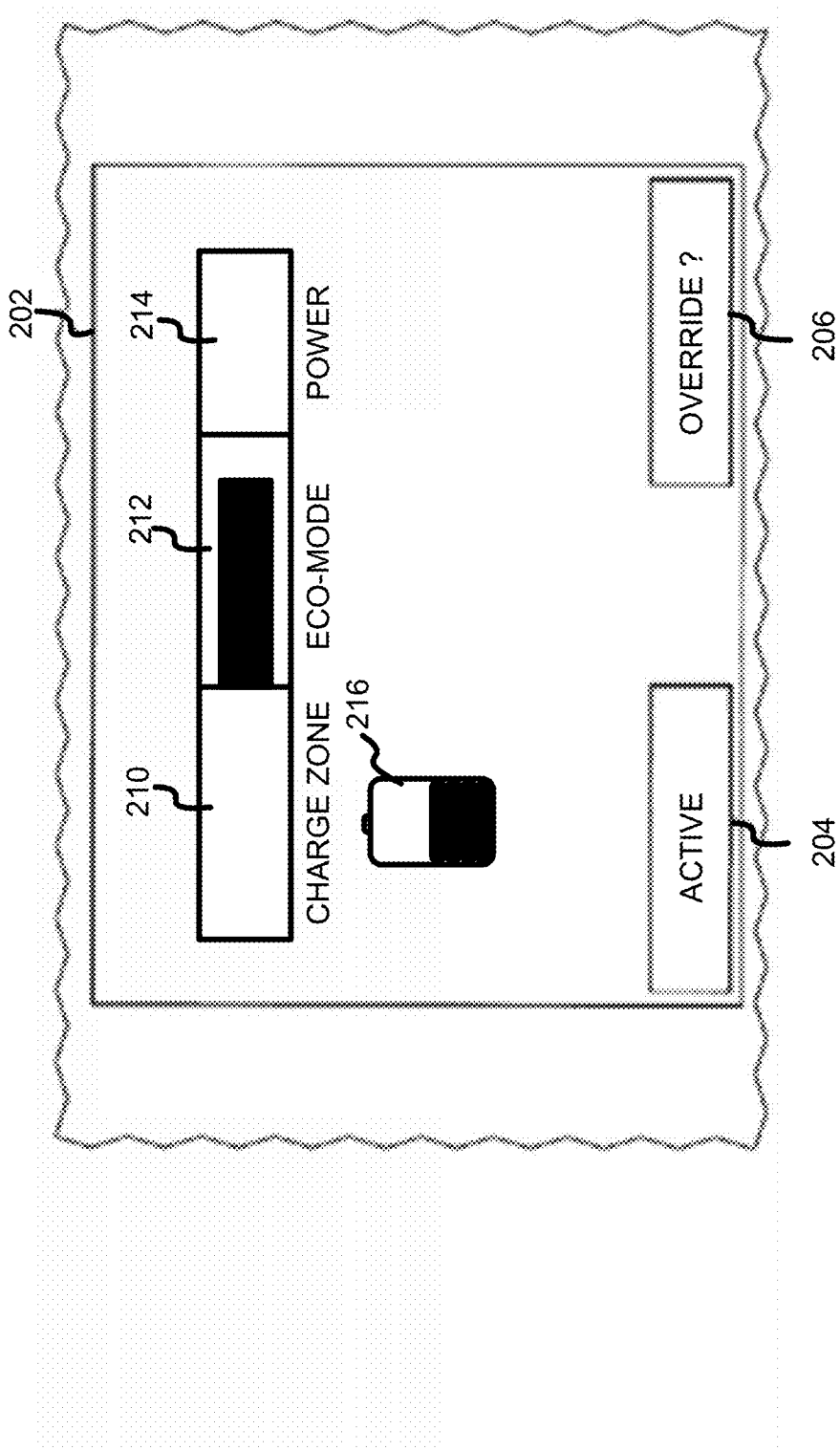
FIG. 2B illustrates an example selective driver coaching user interface for use in the vehicle interior of FIG. 2A.

FIG. 2B illustrates an example implementation of selective driver coaching in accordance with various embodiments. As illustrated in FIG. 2B, a visual representation of different zones of operating efficiency may be displayed on display/head unit 202. For example, a "charge zone" 210 may be represented. The charge zone can indicate a level of operation during which vehicle 10 is recouping energy. For example, as described above, driver coaching circuit 102, after a learning process, may suggest to a driver that he/she should, upon approaching an upcoming turn, take his/her foot off the accelerator pedal. While the vehicle 10 is coasting, regenerative braking may be applied to decelerate the vehicle 10 as it approaches and/or continues through the turn. During this portion of the driving event, due to regenerative braking, battery 44 is being recharged. Accordingly, a visual representation 216 of battery 44's SOC may also be presented on display/head unit 202.

In addition, an "eco-mode zone" 212 may also be represented on display/head unit 202. The eco-mode zone can indicate a zone of operation during which driver coaching can be applied. For example, a bar 212A can be used to indicate when the driver should (if driver-coached operation is to be followed) release the accelerator pedal of vehicle 10. That is, bar 212A may decrease in size or described another way, "move" towards charge zone 210. The disappearance of bar 212A may be signify to the driver that he/she should release the accelerator pedal. Bar 212A may then progress into the charge zone 210 indicating that vehicle 10 is operating in recouping energy.

A power zone 214 may also be presented on display/head unit 202. Power zone 214 may be used to represent a mode of operation during which a "significant" amount of power is being used by vehicle 10. For example, during reacceleration, bar 212A may move into power zone 214. Upon reaching a cruising vehicle speed or when traveling below a certain vehicle speed, bar 212A may move back into eco-mode zone 212. Depending on the vehicle type, model, engine and/or motor used, along with other variables or parameters, the point at which vehicle 10 is considered to be in power zone can differ.

As alluded to above, a user, such as a driver of vehicle 10 may opt to activate or override driver coaching. Accordingly, display/head unit 202 may also display, in this example, softkeys 204 and 206 that allow the user to activate driver coaching or override it, respectively. In some scenarios, a driver may wish to operate vehicle 10 more aggressively. In this case, the driver may simply wish to disable the learning process of driver coaching circuit 102 altogether because he/she knows this particular trip may be an anomalous driving event.

In other embodiments, there may not be a need for this type of user input. For example, based on the above-described comparison of driver-controlled and driver-coached operating efficiency calculations, driver coaching circuit 102 may automatically prohibit learning to be conducted at a particular location, for a particular driving event, etc. That is, driver coaching circuit 102 may be configured to have a learning phase that includes five instances of the same driving event. That is, after five instances, driver coaching circuit 102 may begin providing driver coaching advice to a driver of vehicle 10, e.g., when to coast, at which time regenerative braking is applied. However, driver coaching circuit 102 may continue to obtain or calculate operating efficiency information, and thereby update memory 106. In some instances, this can be done to further refine the driver coaching advice. In those instances where driver-controlled operation of vehicle 10 is more efficient than driver-coached operation of vehicle 10, driver coaching circuit 102 may discontinue collecting information. That is, the location associated with the deceleration event may be tagged or otherwise identified as a location during which learning is not required. In some embodiments, learning may still continue, but driver coaching circuit 102 may discontinue or not provide driver coaching advice.

It should be noted that many different visualizations may be used to represent different states, signify driver coaching advice, etc., and the examples/embodiments illustrated and correspondingly described herein are not meant to be limiting.

Figure 3A:
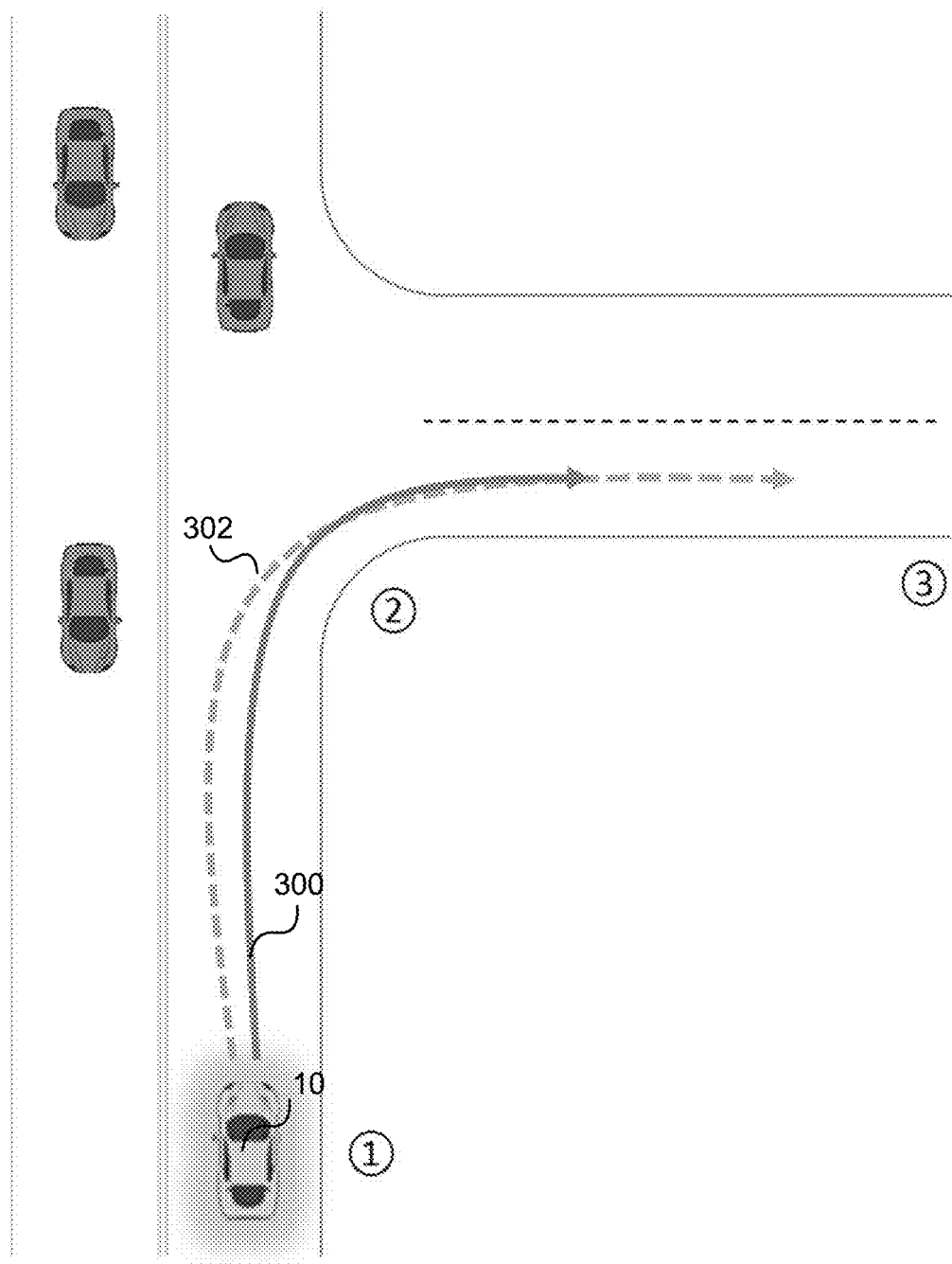
FIG. 3A illustrates an example scenario in which selective driver coaching in accordance with various embodiments may be used.

FIG. 3A illustrates an example scenario during which selective driver coaching might be beneficial to maintain optimal or improved operating efficiency of a vehicle. The various embodiments effectuating selective driver coaching may be described below with reference to this example scenario. After reading this description, one of ordinary skill in the art will understand how systems and methods for selective driver coaching may be implemented in other vehicle environments and/or may be useful in other scenarios. Some of those scenarios may include, but are not limited to approaching a railroad crossing, passing through an area with speed bumps, traveling over varying road grades (uphill and downhill the transitions between them). Any scenario in which a driver may wish to slow down a vehicle without coming to a complete stop and having a desire to reaccelerate thereafter can benefit.

Figure 3B:
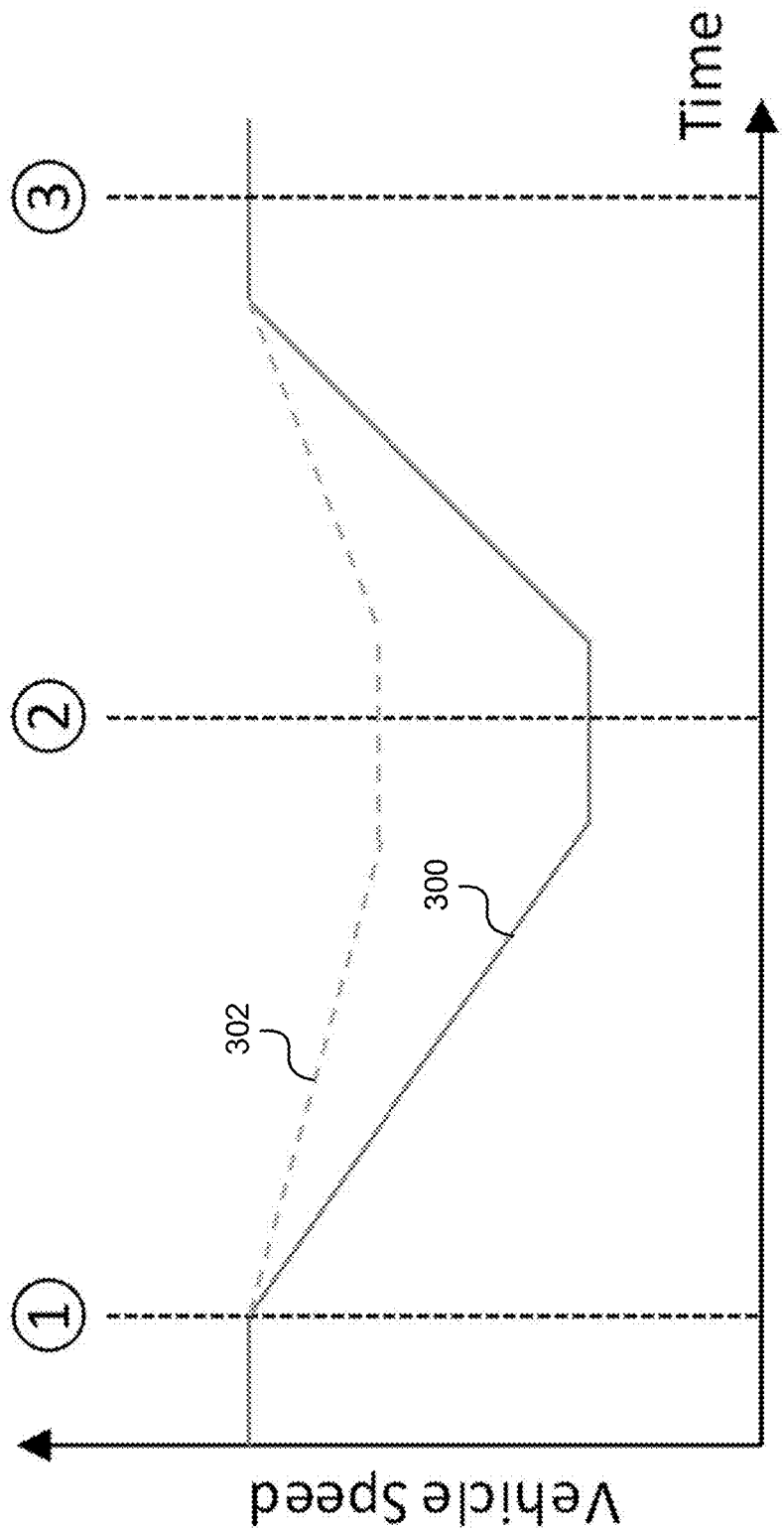
FIG. 3B is an example comparison of driver-controlled operating efficiency and driver-coached operating efficiency.

The example scenario illustrated in FIG. 3A is one in which vehicle 10 may be traveling along a portion of roadway. FIG. 3A will be described in conjunction with FIG. 3B which illustrates corresponding operating efficiency. This particular portion of roadway may include a right turn that vehicle 10 will take/navigate. At a first point/location (1), vehicle 10 is a point during travel when, if driver coaching was enabled, driver coaching circuit 102 would generate driver coaching advice to release the accelerator pedal. This would cause vehicle 10 to coast through the turn at point (2). Referring to FIG. 3B, vehicle 10, until it reaches point (1) may be cruising at some constant vehicle speed. Upon releasing the accelerator pedal at point (1), vehicle 10 begins to decelerate as shown by line 300 indicating vehicle 10's speed over time. Regenerative braking will be applied at point (1) to aid in deceleration and recoup energy. As noted previously, vehicle 10 may coast through the turn at point (2). It can be appreciated that the vehicle 10 may reach its lowest speed just prior to and through the turn at point (2). After vehicle 10 navigates the turn at point (2), driver coaching circuit 102 may provide further driver coaching advice, e.g., advising the driver of vehicle 10 to being reaccelerating until point (3) is reached. At this point, vehicle 10 reaches or returns to its previous (or a new) constant, cruising speed.

However, as previously noted, driver coaching system 102 may provide driver coaching advice based solely on the deceleration of vehicle 10, e.g., through point (1) and until point (2). Thus, the driver of vehicle 10 may, in some cases, operate vehicle 10 with better operating efficiency, e.g., if regenerative braking is not applied at point (1). For example, without driver coaching applied, driver coaching circuit 102 may determine that the driver of vehicle 10 does not slow down as much as if he/she were to follow the coasting advice and regenerative braking were applied. This is seen when comparing line 302 (indicative of vehicle 10's speed over time when controlled by the driver without coaching) to line 300. Moreover, it can be appreciated that because vehicle 10 does not decelerate as much, less power or energy is needed to reaccelerate vehicle 10 after navigating the turn at point (2) until a desired constant, cruising speed at point (3) is reached.

Driver coaching circuit can measure/estimate the overall operating efficiency when vehicle 10 is operated by the driver without driver coaching advice and when vehicle 10 is operated with driver coaching advice. If driver coaching circuit 102 determines that driver-controlled operation is more efficient, driver coaching advice need not be provided to the driver.

Figure 4:
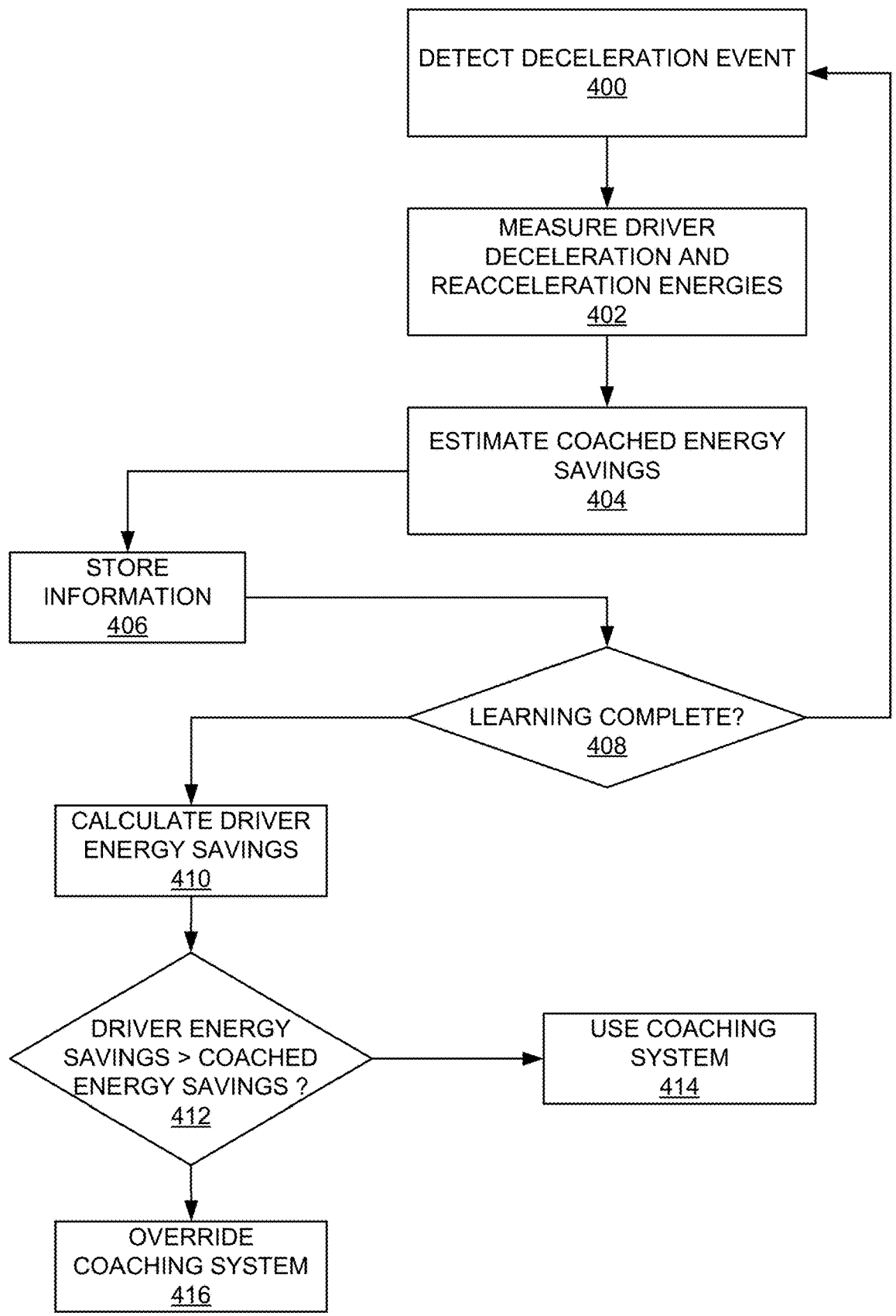
FIG. 4 is a flow chart illustrating example operations that can be performed to achieve selective driver coaching in accordance with one embodiment of the present disclosure.

FIG. 4 is a flow chart illustrating example operations that can be performed to achieve selective driver coaching in accordance with one embodiment of the present disclosure. At operation 400, a deceleration event is detected. As discussed above, information such as a vehicle's deceleration, speed, location, travel route, etc. may be used to determine when the vehicle is approaching or operating within a deceleration event. This deceleration event may be an event that deceleration coaching circuit 102 wishes to control after a learning process as described above.

At operation 402, driver deceleration and reacceleration energies are measured. As described above, deceleration and reacceleration energies may be measured directly by one or more sensors of a vehicle, e.g., one or more of sensors 52 of vehicle 10. In other embodiments one or more of sensors 52 may provide information regarding operating characteristics of vehicle 10 from which the deceleration and reacceleration energies can be calculated or otherwise derived. For example, the amount of battery power and/or fuel consumed during deceleration and reacceleration can be determined. This may be used as a direct measurement of operating efficiency. In other embodiments, this consumption of energies may be used as a function of the distance traversed during the periods of deceleration and reacceleration to determine operating efficiency. It should be understood that while some examples of measuring operating efficiency have been disclosed herein, other methods of determining operating efficiency would be known to those of ordinary skill in the art, and are contemplated herein.

At operation 404, the energy savings due to driver-coached operation are estimated. That is, as described above, driver coaching circuit 102 can estimate, based on learning the deceleration characteristics associated with a deceleration event the amount of energy that can be saved. For example, driver coaching circuit 102 can determine how long a deceleration event lasts based on when a driver starts to decelerate on his/her own and when the driver begins to reaccelerate and when the driver typically reaches a constant, cruising speed. Depending on how much energy can be recouped through regenerative braking, and how much energy is estimated to be needed to reaccelerate, the operating efficiency based on driver-coached operation can be determined.

At operation 406, the respective operating efficiencies, sensor or sensor-based information, or other learned or calculated data can be stored, e.g., in memory 106 (FIG. 1B). It should be noted that this information may alternatively or additionally be stored remotely, e.g., on a remote server, cloud-based storage system, and the like and accessed by a vehicle as needed/upon completion of a learning phase. For example, local, in-vehicle processing may not be as fast or powerful as a dedicated processor. Accordingly, learned information may be stored and processed remotely, where the results of processing, e.g., a determination of operating efficiency, a determination of whether or not to apply driver coaching may be relayed to the vehicle.

As previously discussed, the location and corresponding deceleration/reacceleration associated with that location can be stored. This information can be used to learn the characteristics of a particular deceleration event and location over time. Hence, at operation 408, it is determined whether or not the learning has been completed. In one embodiment, five instances of a deceleration event may be required before driver coaching circuit 102 begins providing driver coaching advice and before driver coaching circuit 102 instructs electronic control unit 50 to implement regenerative braking. Thus, operations 400-406 may be repeated. It should be understood that the number of instances required in order to deem that sufficient information regarding a location and/or deceleration has been collected upon which driver coaching can be based may vary. For example, if information regarding a particular location or deceleration event is irregular or reflects large variations, an extended learning phase may be used by driver coaching circuit 102.

At operation 410, driver-controlled energy savings may be calculated. As described above, the operating efficiency associated with operating a vehicle without driver coaching can be determined based on the driver's deceleration and reacceleration characteristics at a particular location or deceleration event. As also previously described above, driver coaching circuit 102 may obtain this information while in its learning phase (despite in some embodiments, basing driver coaching on deceleration alone). For example, a driver coaching system can be augmented with the selective driver coaching functionality in some embodiments. In other embodiments, the driver coaching system may incorporate selective driver coaching as part of its operation. In some embodiments the operating efficiency may be an average operating efficiency. In some embodiments, the operating efficiency information or data may be weighted, normalized through multipliers, etc.

At operation 412, a comparison is made between driver energy savings, e.g., driver-controller operating efficiency, and driver-coached energy savings, e.g., driver-coached operating efficiency. If the driver-controlled operating efficiency is determined to exceed that of the driver-coached operating efficiency, the driver coaching system can be overridden at operation 416. Again, in some embodiments, selective driver coaching is used to augment an existing driver coaching system, necessitating overriding the existing driver coaching system. In other embodiments, where selective driver coaching is already implemented, driver coaching circuit 102 may simply not generate driver coaching advice based on such a determination. If on the other hand, the operating efficiency based on driver-coached operation of a vehicles is better, the driver coaching system may be used at operation 414. That is, driver coaching advice can be generated and provided to the driver.

Figure 5:
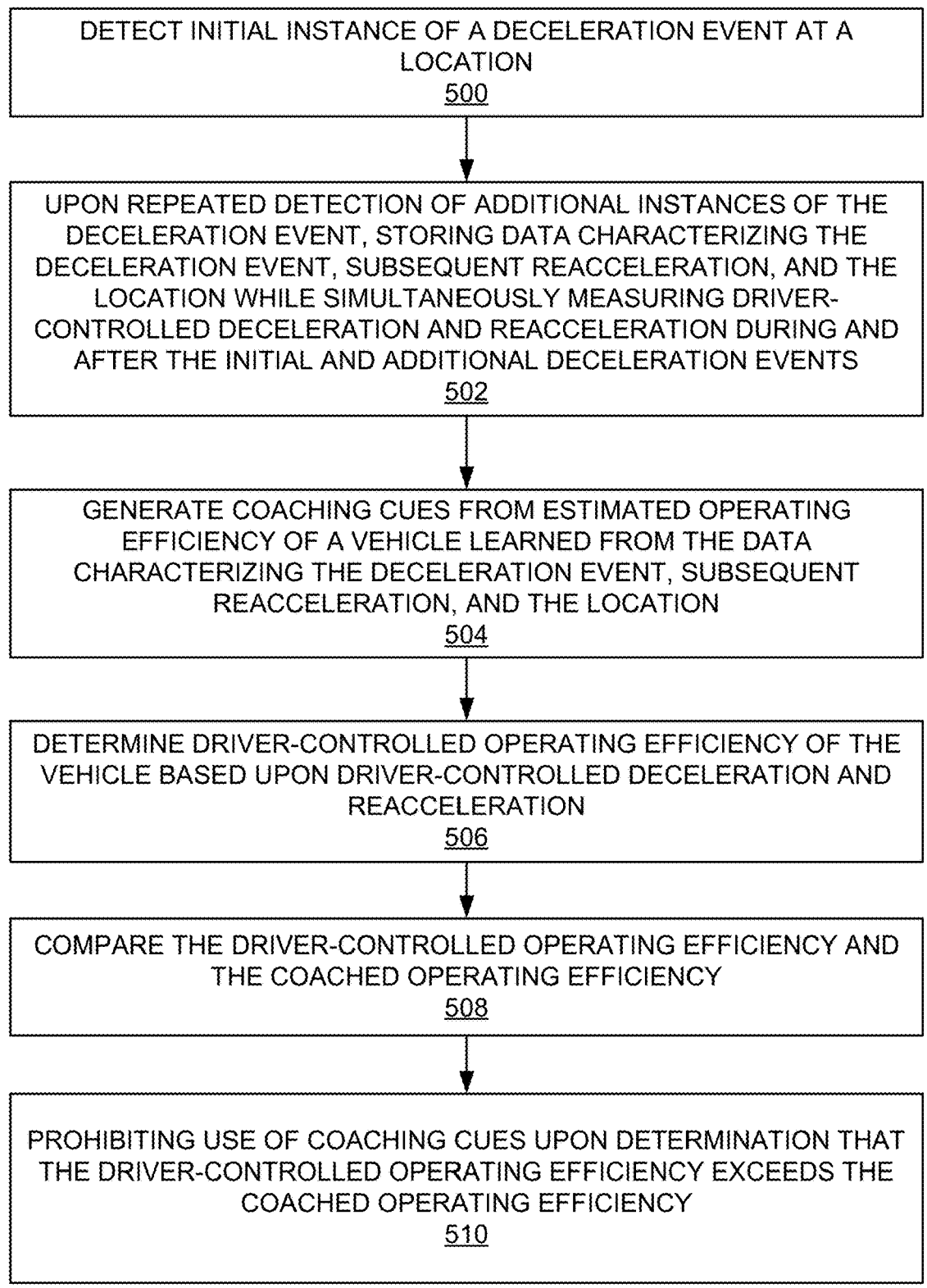
FIG. 5 is a flow chart illustrating example operations that can be performed to achieve selective driver coaching in accordance with one embodiment of the present disclosure.

FIG. 5 illustrates example operations that can be performed to achieve selective driver coaching in accordance with another embodiment of the present disclosure. At operation 500, similar to operation 400 (FIG. 4), an initial instance of a deceleration event at a location is detected. The deceleration event may be in conjunction with a road feature, such as a stop sign, change in road grade, turn, etc.

At operation 502, upon repeated detection of additional instances of the deceleration event, data characterizing the deceleration event, subsequent reacceleration, and location is stored. This collection and storage of data is performed simultaneously with measuring driver-controlled deceleration and reacceleration during and after the initial and additional deceleration events. Over time, driver coaching circuit 102 can learn how a driver navigates a road feature or condition, and can identify when that road feature or condition will arise or occur again so that operating efficiency can be optimized.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

At operation 504, coaching cues are generated from estimated operating efficiency learned from the data characterizing the deceleration event, subsequent reacceleration, and the location. For example, based on the location and deceleration characteristics learned by driver coaching circuit 102, points or locations at which the driver should release the accelerator pedal to initiate coasting and also implement regenerative braking can be determined in order to recoup as much energy as possible. That is, driver coaching circuit 102 aims to expand the opportunities a vehicle may have to recoup energy through regenerative braking.

At operation 506, driver-controller operating efficiency based on driver-controlled deceleration and reacceleration is determined, which at operation 510, may be compared to the coached operating efficiency that was previously estimated. At operation 510, the use, e.g., transmission or presentation, of coached cues can be prohibited upon a determination that the driver-controlled operating efficiency exceeds the coached operating efficiency.

In some embodiments, instead of discrete locations and/or deceleration events being detected, analyzed, and processed as described above, multiple events and/or locations may be analyzed in aggregate. That is, driver coaching circuit 102 (or some remote processor) may analyze a set of deceleration events/locations to determine an optimal operating efficiency. Whether or not driver coaching is used/implemented can depend on an overall operating efficiency associated with an entire trip, route, etc.

Moreover, in some embodiments, data or information characterizing a driving (e.g., deceleration and reacceleration) event and corresponding location can be obtained and stored regardless of whether or not it may be used. In some embodiments this data or information can be maintained in the event that the driver's method of operating a vehicle become less efficient, or if a vehicle is operated by another driver. In this case, the amount of learning required may be lessened due to data or information characterizing the driving event and location already exist. For example, an abbreviated learning phase may be implemented or the existing data or information may simply require fine-tuning before being used to coach a driver, used to compare with driver-controlled operating efficiency, etc.

Figure 6:
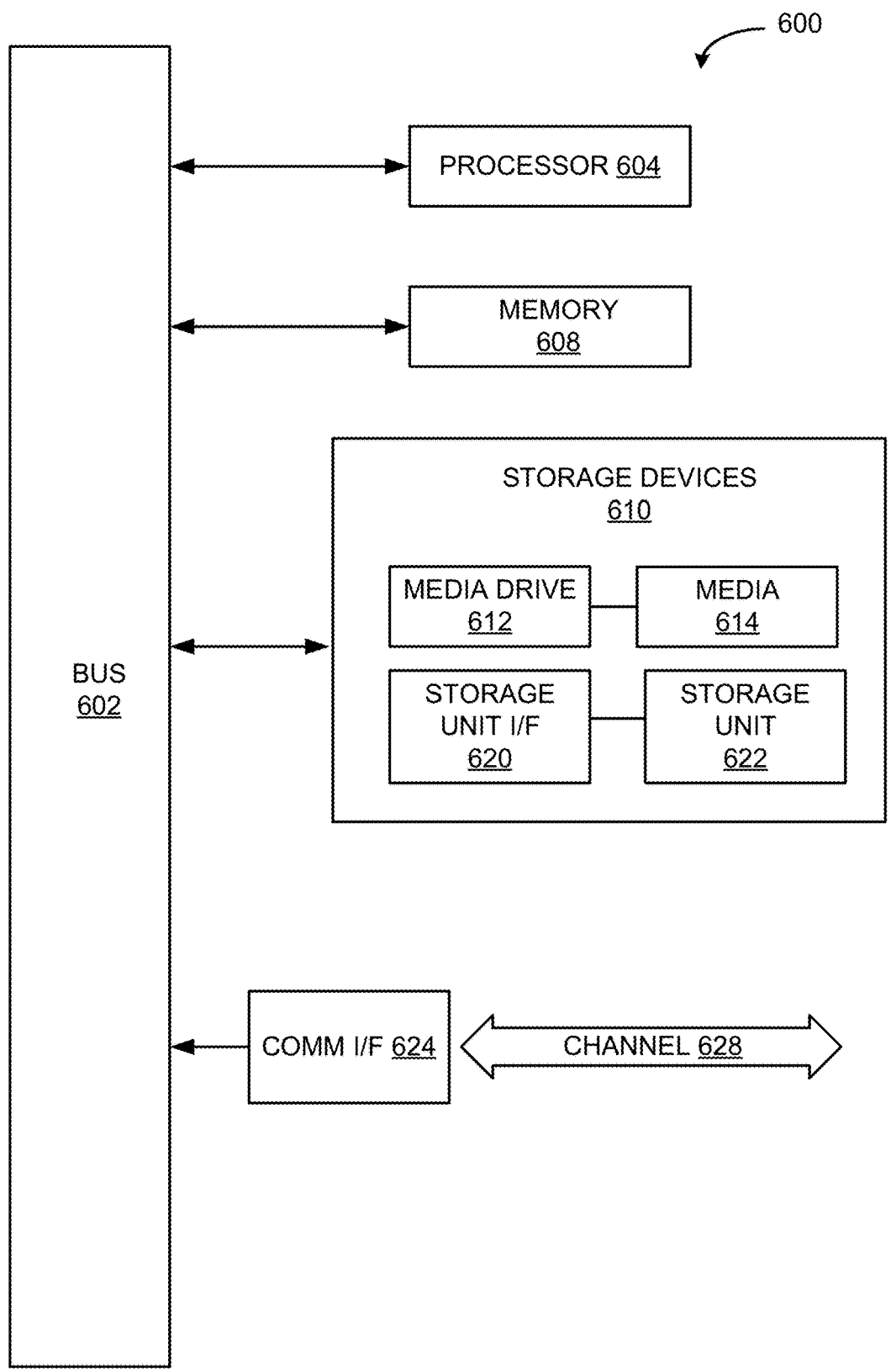
FIG. 6 illustrates an example computing system that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical elements, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example-computing system 600. After reading this description, it will become apparent to a person skilled in the relevant art how to implement the technology using other computing systems or architectures.

Referring now to FIG. 6, computing system 600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment, such as for example, one or more of the elements or circuits illustrated in FIGS. 1A and 1B and described herein. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 600 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit," "component," or "element" does not imply that the aspects or functionality described or claimed as part of the that circuit, component, or element are all configured in a common package. Indeed, any or all of the various aspects or functionality of a circuit, component, or element, whether control logic or other aspect, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
    detecting an initial instance of a deceleration event at a location;
    upon repeated detection of additional instances of the deceleration event, storing data characterizing the deceleration event, subsequent reacceleration, and the location while simultaneously measuring driver-controlled deceleration and reacceleration during and after the initial instance of the deceleration event and the additional instances of the deceleration event;
    generating coaching cues from estimated operating efficiency of a vehicle learned from the data characterizing the deceleration event, subsequent reacceleration, and the location;
    determining driver-controlled operating efficiency of the vehicle based upon driver- controlled deceleration and reacceleration;
    comparing the driver-controlled operating efficiency and the coached operating efficiency; and
    prohibiting use of the coaching cues upon a determination that the driver-controlled operating efficiency exceeds the coached operating efficiency.

2. The computer-implemented method of claim 1, wherein generating coaching cues comprises determining a distance from the location prior to the deceleration event at which the vehicle should begin coasting by a driver of the vehicle releasing an accelerator pedal of the vehicle.

3. The computer-implemented method of claim 2, wherein generating the coaching cues comprises determining a time at which to enable expanded regenerative braking to aid in coached deceleration during the deceleration event following a release of the accelerator pedal.

4. The computer-implemented method of claim 3, wherein a period beginning from the time at which to enable regenerative braking until a second time at which coached reacceleration begins is maximized.

5. The computer-implemented method of claim 1, wherein the driver-controlled deceleration is achieved without engaging in regenerative braking.

6. The computer-implemented method of claim 1, wherein a first speed of travel of the vehicle during the driver-controlled deceleration and reacceleration is faster than a second speed of travel of the vehicle during coached deceleration and reacceleration.

7. A system, comprising:
    one or more sensors configured to determine one or more operating characteristics of a vehicle indicative of a vehicle's operating efficiency;
    a circuit communicatively connected to the one or more sensors via a data interface, the circuit configured to:
        measure the vehicle's operating efficiency during deceleration and subsequent reacceleration as the vehicle navigates a road feature under control of a driver;
        estimate the vehicle's operating efficiency during deceleration and subsequent reacceleration as the vehicle navigates the road feature under assisted-driver control;
        comparing the vehicle's measured operating efficiency under control of the driver and the vehicle's estimated operating efficiency under the assisted-driver control; and
        presenting coaching cues to the driver directing the driver to operate the vehicle in a manner commensurate with the assisted-driver control only upon a determination that the vehicle's estimated operating efficiency under the assisted-driver control is more efficient than the vehicle's measured operating efficiency under control of the driver.

8. The system of claim 7, wherein the assisted-driver control is generated based on maximizing energy through regenerative braking applied during the deceleration.

9. The system of claim 8, wherein the vehicle is a hybrid electric vehicle.

10. The system of claim 9, wherein maximizing the energy through regenerative braking recharges a battery of the hybrid electric vehicle.

11. The system of claim 8, wherein the circuit is further configured to override presentation of the coaching cues upon a determination that the vehicle's measured operating efficiency under control of the driver is more efficient than the vehicle's estimated operating efficiency under the assisted-driver control.

12. The system of claim 11, wherein the vehicle's measured operating efficiency includes a reduced amount of fuel needed by an internal combustion engine of the vehicle to assist in achieving the subsequent reacceleration.

13. A computer-implemented method, comprising:
    detecting a deceleration event while a hybrid electric vehicle (HEV) is operating;
    measuring deceleration and reacceleration energies associated with driver only-controlled operation of the HEV;
    estimating energy savings based on driver-assisted operation of the HEV;
    storing information reflecting the estimated energy savings based on the driver-assisted operation of the HEV;
    calculating the energy savings based on the driver only-controlled operation of the HEV; and
    comparing the calculated energy savings based on the driver only-controlled operation of the HEV to the estimated energy savings based on the driver-assisted operation of the HEV to determine whether or not to generate coaching advice for achieving the driver-assisted operation of the HEV.

14. The computer-implemented method of claim 13, wherein measuring the deceleration and reacceleration energies comprises calculating at least one of battery power consumption and fuel consumption during deceleration and reacceleration of the HEV.

15. The computer-implemented method of claim 14, wherein estimating the energy savings based on the driver-assisted operation of the HEV comprises estimating energy needed during deceleration and reacceleration of the HEV as a function of energy recouped through regenerative braking applied during the deceleration of the HEV.

* * * * *